United States Patent [19]
Sensui

[11] Patent Number: 5,327,192
[45] Date of Patent: Jul. 5, 1994

[54] FOCUS DETECTING APPARATUS

[75] Inventor: Takayuki Sensui, Tokyo, Japan

[73] Assignee: Asahi Kogaku Kogyo Kabushiki Kaisha, Tokyo, Japan

[21] Appl. No.: 885,369

[22] Filed: May 19, 1992

[30] Foreign Application Priority Data

May 20, 1991 [JP] Japan .................. 3-218155

[51] Int. Cl.⁵ .......... G03B 13/36; G02B 7/34
[52] U.S. Cl. ............................ 354/408
[58] Field of Search .......... 354/402, 406, 407, 408

[56] References Cited

U.S. PATENT DOCUMENTS

| Re. 31,370 | 9/1983 | Mashino et al. | 354/402 |
|---|---|---|---|
| 4,047,187 | 9/1977 | Mashimo et al. | 354/402 |
| 4,183,642 | 1/1980 | Fukuoka | 354/402 |
| 4,246,476 | 1/1981 | Stauffer . | |
| 4,346,970 | 8/1982 | Kawabata et al. . | |
| 4,548,495 | 10/1985 | Suzuki | 250/201 |
| 4,560,863 | 12/1985 | Matsumura et al. | 354/407 X |
| 4,563,576 | 1/1986 | Matsumura et al. | 354/402 |
| 4,636,624 | 1/1987 | Ishida et al. | 354/406 X |
| 4,641,022 | 2/1987 | Suzuki | 354/408 X |
| 4,786,934 | 11/1988 | Kunze et al. | 354/409 |
| 4,829,332 | 5/1989 | Shindo | 354/407 |
| 4,857,720 | 8/1989 | Karasaki | 354/408 X |
| 4,859,842 | 8/1989 | Suda et al. | 354/408 X |
| 4,939,357 | 7/1990 | Shindo . | |
| 4,949,116 | 8/1990 | Karasaki et al. | 354/408 |
| 5,005,041 | 4/1991 | Suda et al. | 354/407 |
| 5,017,005 | 5/1991 | Shindo | 354/402 X |
| 5,109,154 | 4/1992 | Higashihara et al. | 354/407 X |
| 5,138,359 | 8/1992 | Nagano et al. | 354/406 |

FOREIGN PATENT DOCUMENTS

| 0430698 | 6/1991 | European Pat. Off. . |
|---|---|---|
| 0479550 | 4/1992 | European Pat. Off. . |
| 3031813 | 3/1981 | Fed. Rep. of Germany . |
| 60-32012 | 2/1985 | Japan . |
| 60-41013 | 3/1985 | Japan . |
| 62-47612 | 3/1987 | Japan . |
| 62-189415 | 8/1987 | Japan . |
| 24 | 1/1990 | Japan . |
| 258012 | 2/1990 | Japan . |
| 1578679 | 11/1980 | United Kingdom . |
| 2178621 | 2/1987 | United Kingdom . |
| 2213602 | 8/1989 | United Kingdom . |
| 2223140 | 3/1990 | United Kingdom . |

OTHER PUBLICATIONS

United Kingdom Search Report.
English abstracts of Japanese Patent Document Nos. 2-58012, 60-32012, 60-41013, 62-47612, 62-189415.
Partial English translation of Japanese Patent Document No. 2-58012.4
English Language Translation of the German Office Action of Sep. 23, 1993.

Primary Examiner—W. B. Perkey
Attorney, Agent, or Firm—Sandler Greenblum & Bernstein

[57] ABSTRACT

A focus detecting apparatus, in which a pair of bundles of rays, transmitted through different portions of an exit pupil of a taking lens, are transmitted through a common focus detecting zone formed on an imaginary focal plane of the taking lens. The focus detecting apparatus includes two image reforming optical systems which reform images of the bundles of rays, incident on the focus detecting zone in different directions and transmitted therethrough, in accordance with a change in position of the exit pupil in the optical axis direction of the taking lens. A pair of line sensors are located at predetermined positions, upon which the images of the respective bundles of rays are reformed through the respective image reforming optical systems.

22 Claims, 8 Drawing Sheets

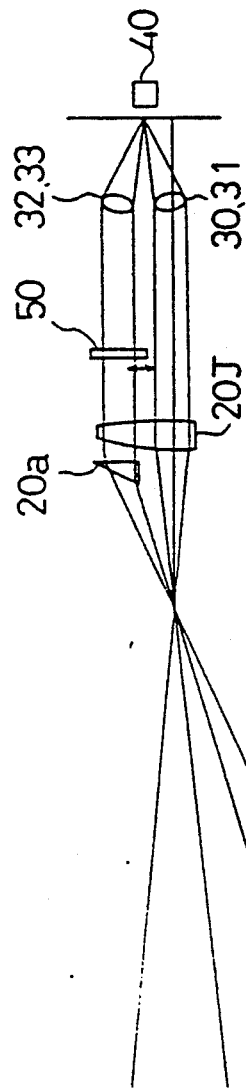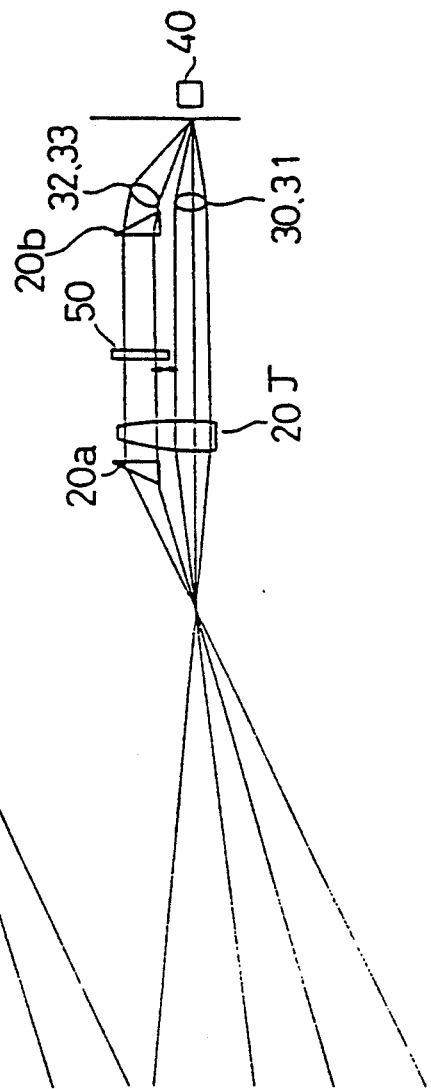
FIG. 6A
FIG. 6B

FOCUS DETECTING APPARATUS

BACKGROUND OF THE INVENTION

1. Field of the Invention

The present invention relates to a focus detecting apparatus for detecting a focus state of a taking lens of a camera or the like, with respect to an object to be photographed.

2. Description of Related Art

In a known focus detecting apparatus in a single lens reflex camera or the like, bundles of rays transmitted through different portions of an exit pupil of a taking lens are converged onto a pair of line sensors by an image reforming lens of a focus detecting optical system, so that the focus state of the taking lens can be detected in accordance with a relationship between outputs of the line sensors. The principle of the focus detection by the focus detecting apparatus is disclosed, for example, in U.S. Pat. No. 4,636,624.

A focus detecting apparatus having an off-axis detecting area, that deviated from an optical axis, is a known apparatus for detecting the focus state of a taking lens with respect to an object located at a position other than the center of an image plane.

However, if the deviation of the off-axis detecting area from the optical axis increases, vignetting focus detecting optical system pupil occurs when position or size of the exit pupil of the taking lens changes as a result of a lens change (i.e., when using an interchangeable lens), or during a zooming operation. In such cases, the area of the focus detecting optical system pupil, through which the bundle of rays is transmitted, is reduced. As a result, the applicability of such an automatic focus detecting system to an interchangeable lens is restricted, or it is possible that the automatic focus detecting system will not work at a specific focal length within a zooming range.

To solve these problems, it is known to provide three image reforming optical systems using three bundles of rays transmitted through three different portions of the exit pupil of the taking lens in a focus detecting apparatus having an off-axis detecting area, as disclosed for example in Japanese Kokai patent publication No. HEI 2-58012. In this focus detecting apparatus, the outputs of line sensors, corresponding to two of three image reforming optical systems in which no vignetting occurs, are used to detect an focus with respect to the object within the image plane. Accordingly, the adverse influence of vignetting on the focus detecting optical system, due to the change of the exit pupil of the taking lens, is eliminated.

However, in the known focus detecting apparatus, as mentioned above, the three image reforming optical systems must be provided in a single detecting area and the three line sensors must be arranged along a diametric direction of the taking lens.

Furthermore, if the area to be detected is large, namely, is an image is long, vignetting may also occur in an area including the optical axis of the taking lens. The prior art mentioned above does not solve this problem.

SUMMARY OF THE INVENTION

A primary object of the present invention is to provide a focus detecting apparatus in which the focus state of various taking lenses can be detected by only two image reforming optical systems for one detecting area, even if the detecting area including the optical axis contains a long image.

To achieve the object mentioned above, according to the present invention, there is provided a focus detecting apparatus in which a pair of bundles of rays transmitted through different portions of an exit pupil of a taking lens, are transmitted through a common focus detecting zone formed on an imaginary focal plane of the taking lens, so that images of the bundles of rays are formed on predetermined positions. The focus detecting apparatus comprises at least two image reforming optical systems which reform images of the bundles of rays incident on the focus detecting zone from different directions, in accordance with a change in position of the exit pupil in an optical axis direction of the taking lens. The apparatus further comprises at least one pair of line sensors located at said predetermined positions, so that the images of the bundles of rays are reformed on the respective line sensors through respective image reforming optical systems.

According to an aspect of the present invention, there is provided a focus detecting apparatus in which a pair of bundles of rays transmitted through different portions of an exit pupil of a taking lens are transmitted through a common focus detecting zone formed on an imaginary focal plane of a taking lens, so that images of the bundles of rays are formed on predetermined positions. The apparatus comprises at least two image reforming optical systems which reform images of the bundles of rays incident on the focus detecting zone from different directions, in accordance with a change in position of the exit pupil in an optical axis direction of the taking lens. The apparatus also comprises a common line sensor located at said predetermined positions, so that the images of the bundles of rays are reformed on the common line sensor through respective image reforming optical systems.

According to another aspect of the present invention, a focus detecting apparatus comprises a first image reforming optical system which transmits an image formed by a taking lens on a focus detecting zone of an imaginary focal plane, through a first light gathering means and reforms the image on at least one line sensor having picture elements. The apparatus further comprises a second image reforming optical system which has a second light gathering means spaced from the first light gathering means in a direction that is perpendicular to the direction of alignment of the picture elements of the line sensor. The second image reforming optical system transmits an image, formed by the taking lens on the focus detecting zone of the imaginary focal plane, through a second light gathering means and reforms the image on the line sensor, wherein the bundle of rays are incident from a direction different from that of the bundle of rays incident on the first image reforming optical system.

The present disclosure relates to subject matter contained in Japanese patent application. No. HEI 3 218155 (filed on May 20, 1991), which is expressly incorporated herein by reference in its entirety.

BRIEF DESCRIPTION OF THE DRAWINGS

The invention will be described below in detail with reference to the accompanying drawings, in which:

FIGS. 2A, 2B and 2C are schematic views of main parts of three modifications of a focus detecting apparatus shown in FIG. 1, of which, FIG. 2A shows two condenser lenses having the same power and a single prism, FIG. 2B shows two condenser lenses having different powers, and FIG. 2C shows a single aspherical condenser lens, respectively;

FIGS. 4A and 4B show two different modifications of the first embodiment using common separator lenses, of which, FIG. 4A shows two condenser lenses having different powers, and FIG. 4B shows two condenser lenses having different powers and a single prism, respectively;

FIGS. 5A, 5B and 5C show three different modifications of the first embodiment using common separator lenses, of which, FIG. 5A shows two condenser lenses having different powers and single prism, FIG. 5B shows a single aspherical condenser lens, and FIG. 5C shows a single condenser lens and a single prism, respectively;

FIG. 6A and 6B show two modifications of the first embodiment using a common line sensor, of which, FIG. 6A shows a single condenser lens and a single prism, and FIG. 6B shows a single condenser lens and two prisms, respectively;

DESCRIPTION OF THE PREFERRED EMBODIMENTS

Figure 1:
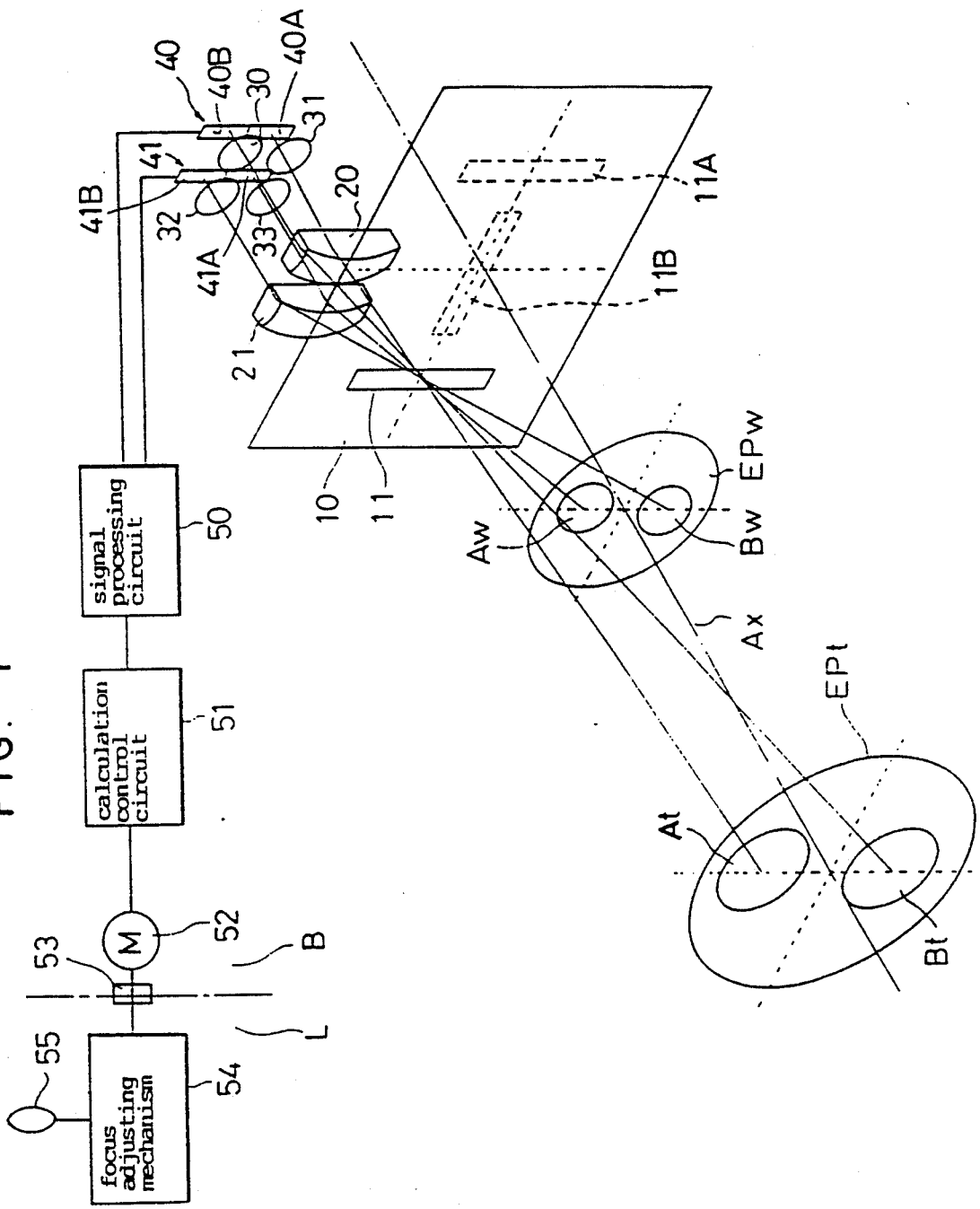
FIG. 1 is a perspective view of a focus detecting apparatus according to a first embodiment of the present invention.

FIG. 1 shows a first embodiment of the present invention. A focus detecting zone 11, which is elongated in a direction perpendicular to a radial direction (sagittal direction) at a position deviated from an optical axis Ax of a taking lens L (FIG. 1), is provided on an imaginary focal plane 10. An image of an object is formed by the taking lens L on the focus detecting zone 11 to detect a focus state of the taking lens L with respect to an image within the focus detecting zone 11. The imaginary focal plane 10 is located at a position that is conjugate with an actual focal plane.

As is well known, an exit pupil EPt of the taking lens L at a telephoto extremity is spaced farther from the imaginary focal plane 10 than at exit pupil EPw thereof at a wide angle extremity. Furthermore, the size of the exit pupil varies depending on the F-number of the taking lens.

In view of this, there are provided two sets of image reforming optical systems of a focus detecting optical system corresponding to one focus detecting zone 11, in the first embodiment of the present invention, so that one set of the two image reforming optical systems may be selectively used in accordance with the position of the exit pupil of the taking lens.

The first image reforming optical system receives a pair of bundles of rays transmitted through different portions At and Bt of the taking lens exit pupil EPt at a telephoto extremity and through a first condenser lens 20. The received pair of bundles of rays is made incident upon a pair of separator lenses 30 and 31, so that two separate images within the detecting zone 11 are formed on respective sensor portions 40A and 40B of a first line sensor 40.

Similarly, the second image reforming optical system includes a second condenser lens 21, a pair of separator lenses 32 and 33, and a second line sensor 41. The second condenser lens 21 receives a pair of bundles of rays transmitted through different portions Aw and Bw of the taking lens exit pupil EPw of the taking lens at a wide angle extremity. The received pair of bundles of rays is made incident upon a pair of separator lenses 32 and 33, so that two separate images are formed on respective sensor portions 41A and 41B of the second line sensor 41.

The line sensors 40 and 41 each include two sensor portions 40A and 40B, and 41A, and 41B, which receive a pair of split images, respectively. The focus state of the taking lens L with respect to the image within the detecting zone 11 can be detected by calculating the positional relationship of the split images formed in the respective sensor portions 40 or 41 comprising pairs of sensors 40A, 40B or 41A, 41B, respectively.

Namely, the outputs of the line sensors 40 or 41 are inputted to a signal processing circuit 50 and a calculation controlling circuit 51 which calculates a positional relationship of the split images, to thereby detect a amount of defocus of the object, based on the outputs of the line sensors 40 or 41. The calculation controlling circuit 51 drives a control motor 52 provided in a camera body B, based on the calculation results, and actuates a focus adjusting mechanism 54 of the taking lens L, through a drive coupling 53, to thereby move a focus adjusting lens 55 in the optical axis direction.

The output of either line sensor 40 or 41, to be used for calculation, can be selected in advance. Namely, the position and size of the exit pupil of the taking lens L depend on the focal length and the F-number thereof. The focal length and the F-number are inherent data peculiar to the taking lens, and accordingly can be stored in a lens ROM or CPU in the interchangeable lens (taking lens) L. Consequently, the selection of the line sensor output 40 or 41 can be predetermined in accordance with the kind of interchangeable lens to be used, through data communication between the interchangeable lens L and the camera body B of a single lens reflex camera, by a known communicating means.

When a zoom lens is to be used, the output of either line sensor 40 or 41 is determined in accordance with the focal length thereof.

Alternatively, it is possible to automatically and selectively use the outputs of the line sensors 40 or 41 in accordance with the quantity of light incident thereon.

The condensor lenses 20 and 21 function as light gathering means which gather light transmitted through the focus detecting zone 11 to form images on the line sensors 40 and 41, respectively. The condenser lenses 20 and 21 are located side by side in parallel and spaced from one another in a direction that is perpendicular to the direction of alignment of picture elements of the line sensors 40 and 41. The condensor lenses 20 and 21 transmit the bundle of rays incident on the detecting zone 11 at different angles, depending on the change in the position of the exit pupil, in a substantially parallel direction. The power of the condenser lenses 20 and 21 gradually changes in a direction perpendicular to the longitudinal direction (i.e., alignment direction of the picture elements) of the line sensors 40 and 41.

In the focus detecting apparatus as constructed above, if a change in the exit pupil of the taking lens takes place, the focus state of the taking lens, with respect to an object image, can be precisely detected by selecting one of the two image reforming optical systems in accordance with the position and size of the exit pupil.

The feature that both the two image reforming optical systems can detect the focus state for one object located at the same position is advantageous, particularly when the focus detecting apparatus of the invention is incorporated in a camera. Namely, a focus detecting zone representing a range of the focus detection is usually indicated in a finder system of an automatic focusing camera. A photographer positions the object to be photographed within the focus detecting zone of the finder, so that the focus of the taking lens can be automatically adjusted.

However, if the focus detecting zone on the imaginary focal plane is moved, for example, by the switching of the image reforming optical system, the detecting zone in the finder will no longer be coincidental with an actual zone to be detected, and the taking lens will be focused for an object other than the object the photographer intends to photograph.

Figure 2A:
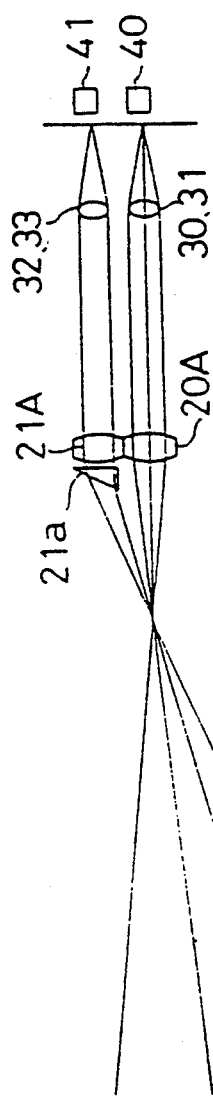
Figure 2B:
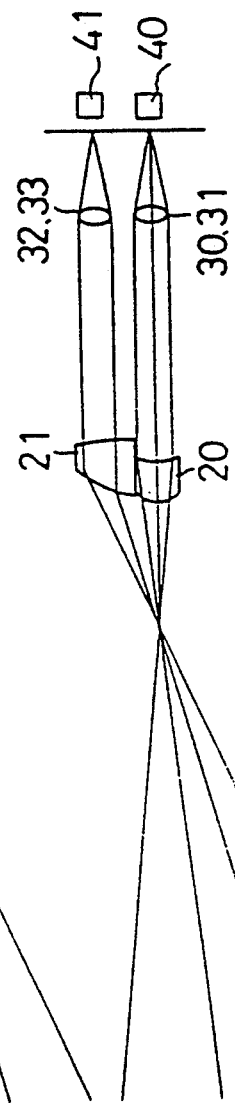
Figure 2C:
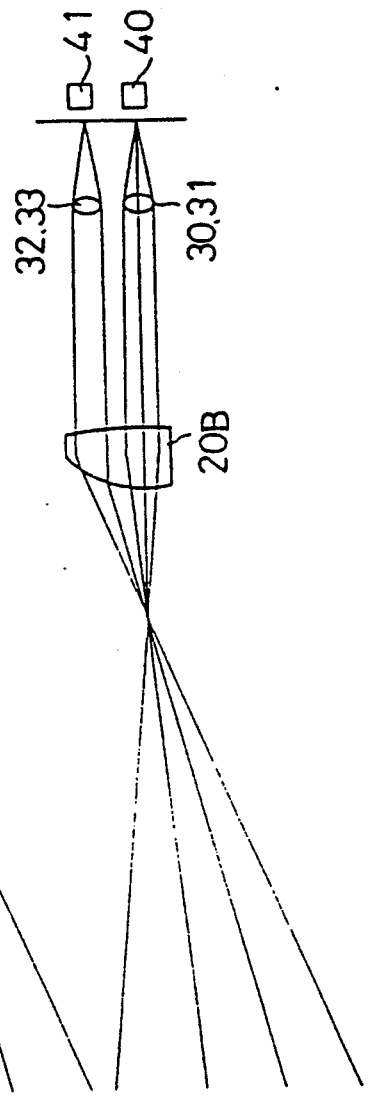

FIGS. 2 (2A, 2B and 2C) through 6 (6A and 6B) show several modifications of the first embodiment illustrated in FIG. 1. In FIGS. 2A, 2B and 2C, each of the image reforming optical systems include a line sensor and separator lenses, similar to FIG. 1. In the arrangement shown in FIG. 2A, the image reforming optical systems include respective condenser lenses 20A and 21A having approximately the same power. A prism 21a is provided in front of the condenser lens 21A. The deflection function of the prism 21a allows for the use of identical condenser lenses 20A and 21A to gather light.

Note that in FIGS. 2 through 6, the direction of the alignment of the picture elements of the line sensors 40 and 41 is perpendicular to the plane of the drawings.

In FIG. 2B, the two condenser lenses 20 and 21 are provided with different powers which gradually change in the direction perpendicular to the alignment direction of the picture elements of the line sensors 40 and 41, similar to FIG. 1.

In FIG. 2C, a single aspherical condenser lens 20B, common to the two image reforming optical systems, is provided. The aspherical condenser lens 20B has a power which increases toward the peripheral edge from the center thereof, so that the bundle of rays transmitted through an upper portion of a tall image is more sharply refracted than the bundle of rays transmitted through the center portion of the image. The light is thereby emitted from the aspherical condenser lens 20B in a substantially parallel direction.

Figure 3:
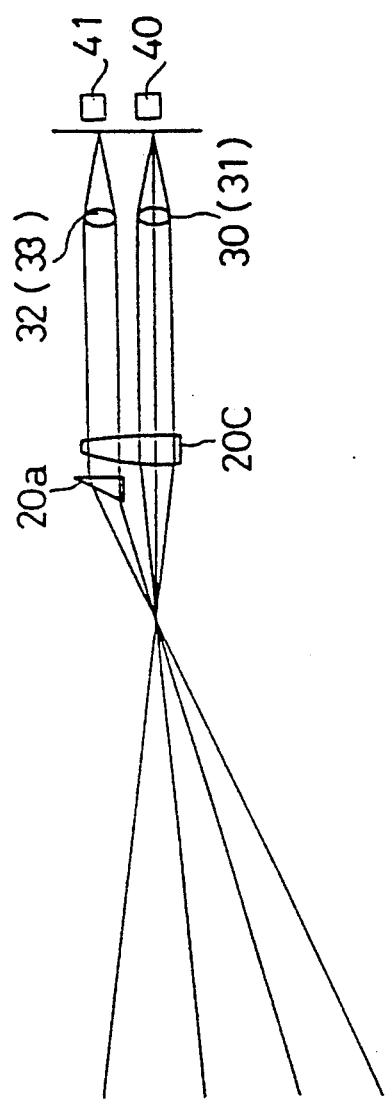
FIG. 3 shows a modification of the first embodiment, in which one condenser lens and one prism are used.

FIG. 3 shows another modification of FIG. 1, in which a single condenser lens 20C is used. A prism 20a is provided in the optical path of the image reforming optical system which receives light at the wide angle extremity. The prism 20a enables the single condenser lens 20C, on which a bundle of rays is made incident from different directions, to emit a bundle of rays substantially in a parallel direction.

FIGS. 4A, 4B, 5A, 5B, and 5C show additional modified examples of FIG. 1, in which the two image reforming optical systems have common separator lenses. In the arrangements shown in FIGS. 4A through 5C, one of the condenser lenses (condenser means) 21, 21A, 21B shown in the arrangements shown in FIGS. 1 through 3 has a stronger power, so that the bundle of rays is made incident upon the separator lenses 30, 31, common to the two image reforming optical systems, and the split images are formed on the separate line sensors 40 and 41. Namely, the separator lenses 32 and 33 are not provided in the arrangement shown in FIGS. 4A through 5C.

Figure 4A:
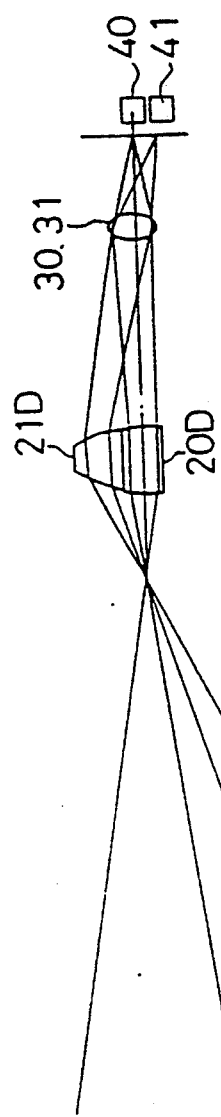
Figure 4B:
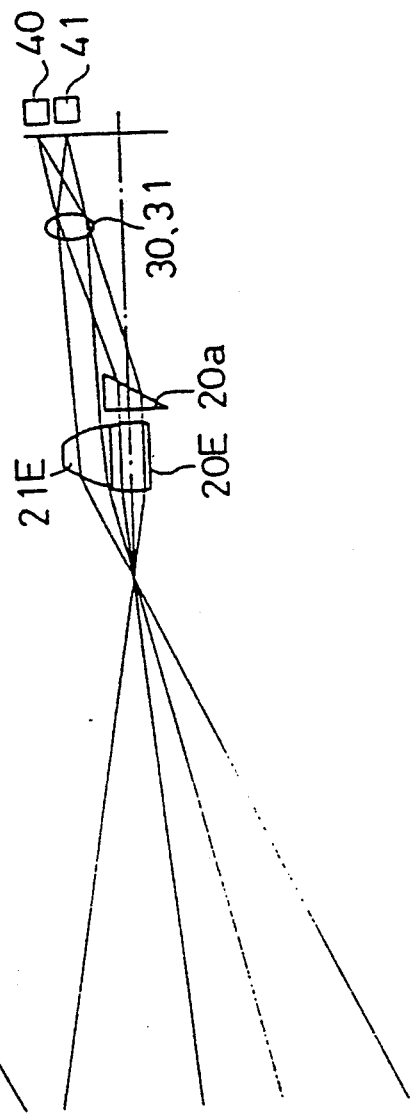

In FIG. 4A, there are two condenser lenses 20D and 21D having different powers. In FIG. 4B, the light gathering means of one of the image reforming optical systems, that gathers light in the telephoto mode, includes a composite optical system having a condenser lens 20E and a prism 20a, and the light gathering means of the other image reforming optical system includes a single condenser lens 21E, respectively.

Figure 5A:
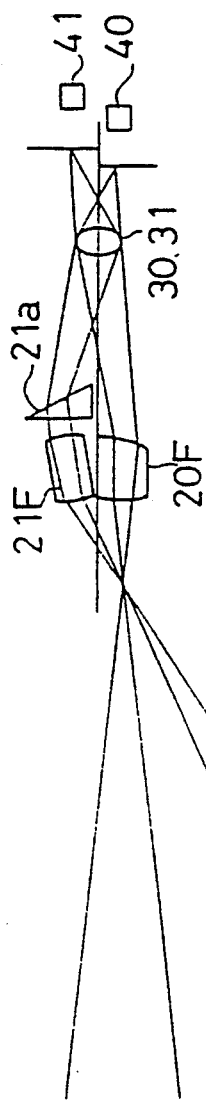
Figure 5B:
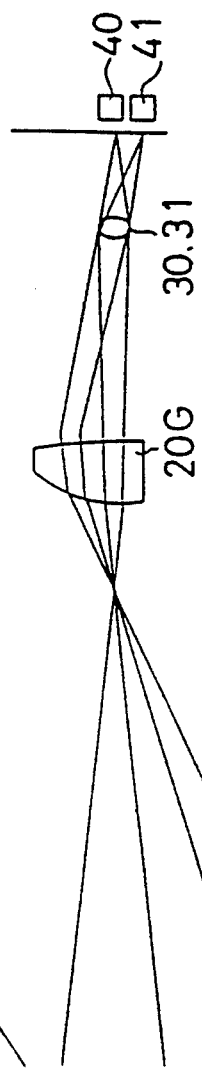
Figure 5C:
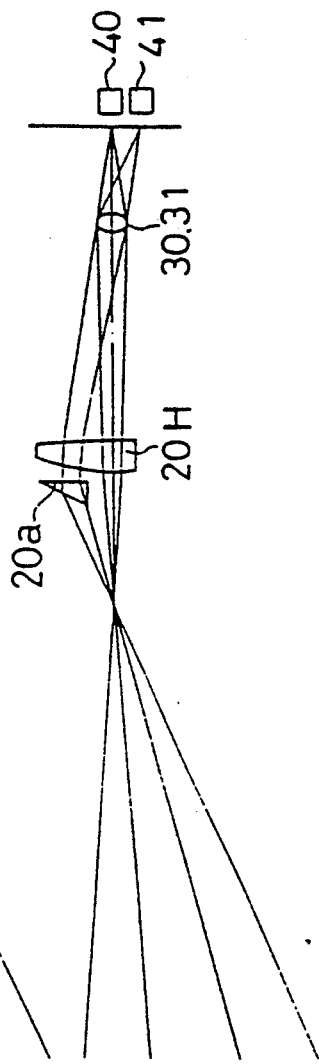

In FIG. 5A, one of the condenser lenses 20F and 21F that gathers light in the wide angle mode, i.e., the condenser lens 21F, has an inclined optical axis and a prism 21a, which is provided behind the condenser lens 21F. In FIG. 5B, there is a single aspherical condenser lens 20G common to the two image reforming optical systems. The single aspherical condenser lens 20G has a power which gradually increases from the center towards the peripheral edge thereof. In FIG. 5C, there is a single condenser lens 20H common to the two image reforming optical systems and a prism 20a, which is provided in the optical path of one of the two image reforming optical systems that gathers light in the wide angle mode.

In FIGS. 6A and 6B, there is a single line sensor 40 that is common to the two image reforming optical systems. To allow for the common use of the single line sensor 40, it is necessary to intercept the optical path of the image reforming optical systems which is not being used, to thereby detect only the bundle of rays of the image reforming optical system which is to be used, in accordance with the position of the exit pupil of the taking lens.

To this end, in the arrangement illustrated in FIG. 6A, there is a single condenser lens 20J and a prism 20a that is provided in the optical path of the image reforming optical system that gathers light in the wide angle mode. A light intercepting plate 50 is movable in directions shown by an arrow in FIG. 6A to selectively intercept only the optical path of the image reforming optical system that is not used for detection.

In FIG. 6B, a second prism 20b is provided in front of the separator lenses 32 or 33 of the image reforming optical system that gathers light in the wide angle mode, in addition to the components in the arrangement shown in FIG. 6A.

As can be seen from the above discussion, according to the present invention, the common use of the separator lenses or the line sensor contributes to a reduction in the number of necessary components and a simplification in the construction of the apparatus.

Although the above discussion has been directed to a single detecting zone 11, provided at a position that deviates from the optical axis, for the purpose of simplifying the explanation, it is possible to provide two additional detecting zones 11A and 11B (FIG. 1) at a position that is symmetrical to the detecting zone 11 with respect to the optical axis and a position on the optical axis between the aforementioned two detecting zones 11 and 11A. This alternative is a preferred arrangement for its practicability, since a more appropriate detecting zone, corresponding to the object to be focused, can be selected from among the three detecting zones to detect the focus state of the taking lens.

Figure 7:
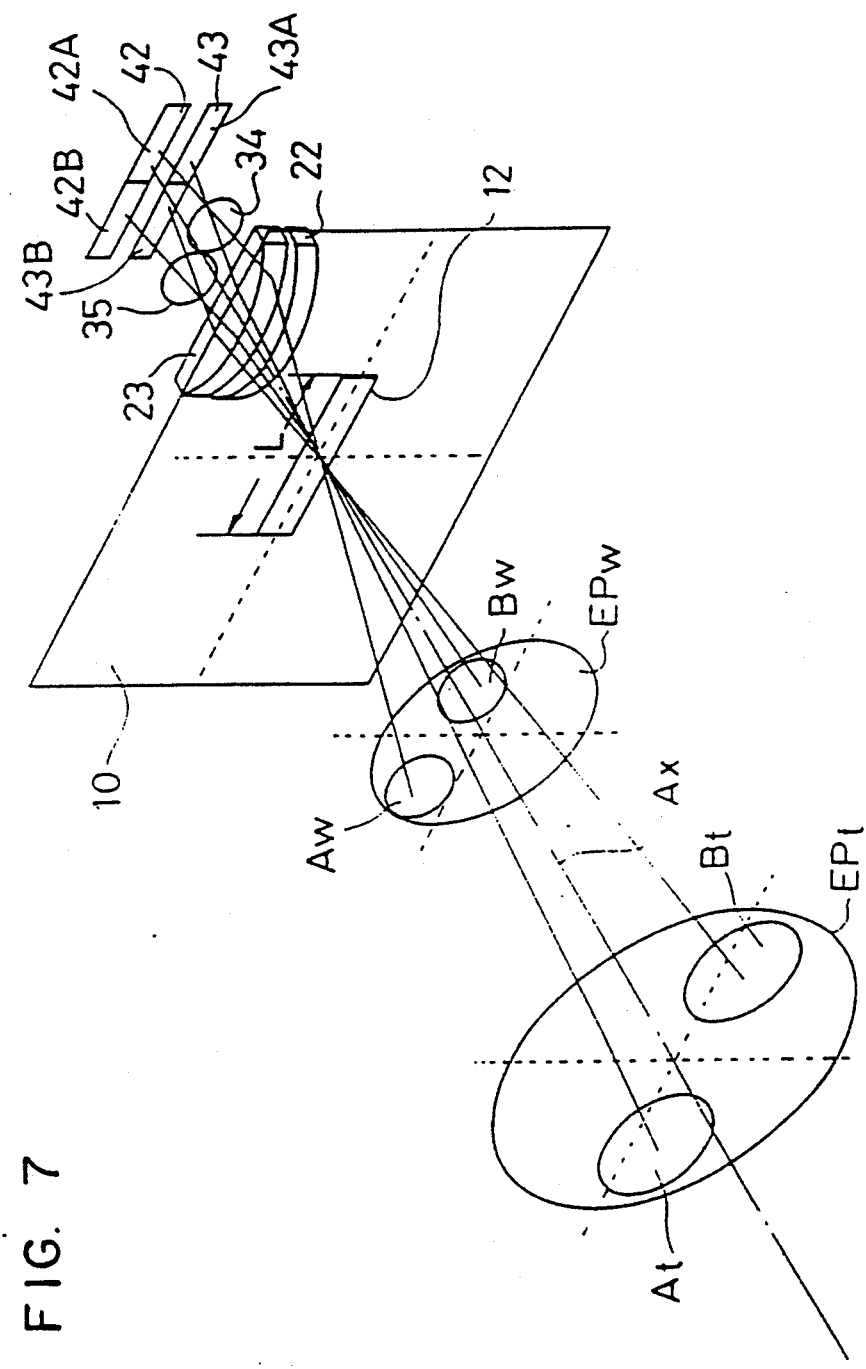
FIG. 7 is a perspective view of a focus detecting apparatus according to a second embodiment of the present invention; and, FIG. 8 is a plan view of FIG. 7.

FIG. 7 shows another embodiment of the present invention. In this embodiment, detecting zone 12 is located at the center of an imaginary focal plane 10, i.e., at a position that includes including the optical axis Ax of the taking lens. The two image reforming optical systems are selectively used for the detecting zone 12.

A bundle of rays, emitted from different portions Aw and Bw of exit pupil EPw of the taking lens at a wide angle extremity and transmitted through a detecting zone 12, is gathered and deflected by the first condenser lens 22 and is imaged on portions 42A and 42B of line sensor 42 by separator lenses 34 and 35.

On the other hand, a bundle of rays, emitted from different portions At and Bt of exit pupil EPt of the taking lens at a telephoto extremity and transmitted through the detecting zone 12, is gathered and deflected by second condenser lens 23 and is imaged on portions 43A and 43B of line sensor 43 by separator lenses 34 and 35. The object image, which is the same as that formed on the detecting zone 12, is split and formed on the line sensors 42 or 43.

Figure 8:
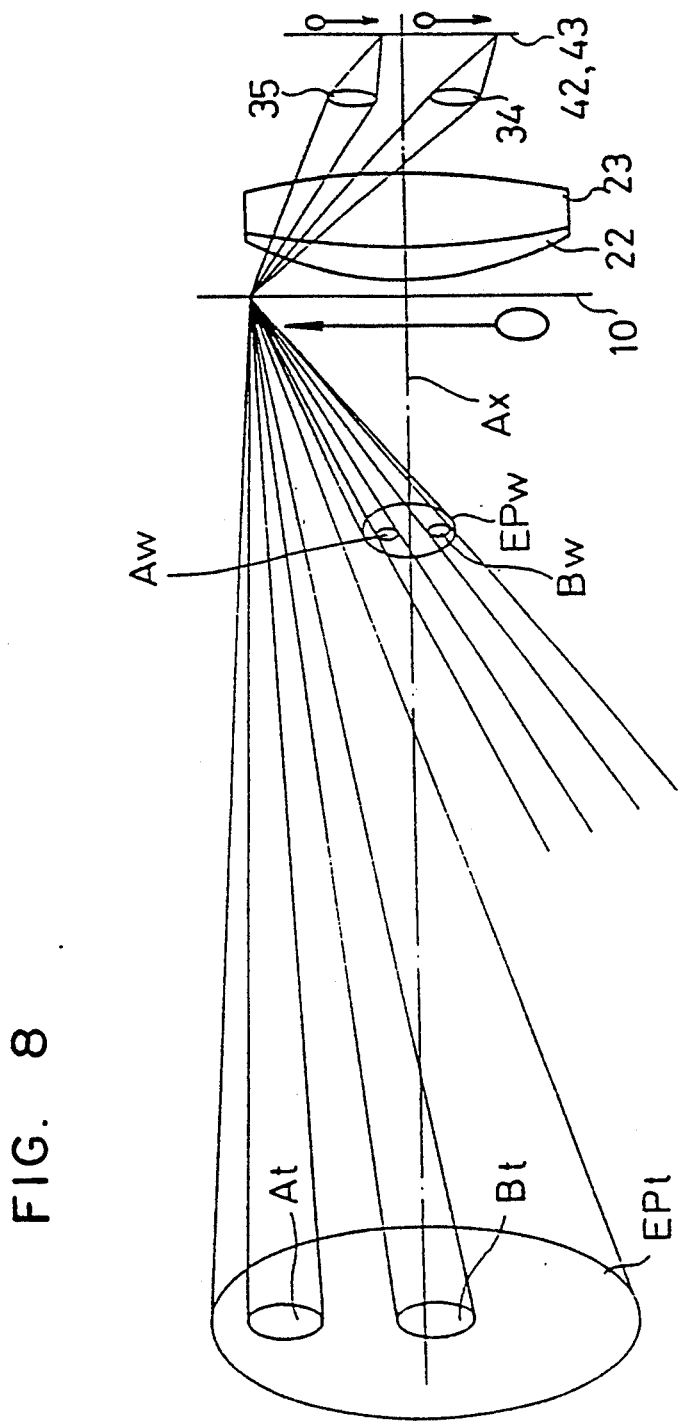

When the elongated detecting zone 12 is symmetrical with respect to the optical axis, as shown in FIG. 7, and if longitudinal length L of the detecting zone is small, the latter can be easily influenced by a change in the exit pupil of the taking lens. However, if the longitudinal L is large, the bundle of rays, transmitted through the exit pupil EPt at the telephoto extremity, does not overlap the bundle of rays transmitted through the exit pupil EPw at the wide angle extremity at the upper portion of the object image, as shown in FIG. 8. Consequently, if a single condenser lens 23, which can effectively gather light in the wide angle mode, were used, the bundle of rays corresponding to the upper portion of the object image can not be gathered in the wide angle mode by the condenser lens 23.

To solve this problem, the condenser lens system is made of a composite optical system having a strong condenser lens 22 and a weak condenser lens 23 in combination, in the embodiment illustrated in FIGS. 7 and 8. Consequently, in the telephoto mode, the image reforming optical system comprised of the weak condenser lens 23 and the common separator lenses 34, 35 is used to form an image on the line sensor 43. Conversely, in the wide angle mode, the image reforming optical system comprised of the strong condenser lens 22 and the common separator lenses 34, 35 is used to form an image on the line sensor 42.

As can be understood from the above discussion, according to the present invention, the image reforming optical systems are selectively used in accordance with a change in the position and size of the exit pupil of the taking lens. Accordingly, vignetting of light does not occur, and a sufficient quantity of light can be received by the line sensor or sensors. Thus, the focus state of the taking lens can be precisely detected.

I claim:

1. A focus detecting apparatus in which a pair of bundle of rays, transmitted through different portions of an exit pupil of a taking lens, are transmitted through a common focus detecting zone formed on an imaginary focal plane of the taking lens, comprising:

at least two re-imaging optical systems, each of which reform images of said pair of bundle of rays onto a pair of respective line sensors, said pair of line sensors being provided for each of said at least two re-imaging optical systems, wherein each of said pair of line sensors receives, through each of said at least two re-imaging optical systems, images of said pair of bundle of rays, that are incident on said focus detecting zone in different directions and which are transmitted therethrough, in accordance with a change in position of said exit pupil in an optical axis direction of said taking lens.

2. The focus detecting apparatus of claim 1, wherein each of said at least two re-imaging optical systems comprise a condenser lens on which said bundle of rays, having different incident angles with respect to said focus detecting zone, are made incident, and a separator lens which makes said bundle of rays, transmitted through said condenser lens, incident on split portions of a corresponding line sensor of said pair of line sensors.

3. The focus detecting apparatus of claim 1, wherein said at least two re-imaging optical systems comprises a common condenser lens and separator lenses which make said associated bundle of rays, transmitted through said common condenser lens, incident on split portions of respective line sensors of said pair of line sensors.

4. The focus detecting apparatus of claim 3, wherein one of said at least two re-imaging optical systems comprises a prism that is located before said common condenser lens to refract an optical path of said associated bundle of rays.

5. The focus detecting apparatus of claim 1, wherein said at least two re-imaging optical systems comprise separate condenser lenses on which said bundle or rays, having different incident angles with respect to said focus detecting zone, are made incident, and a common separator lens which makes said bundles of rays transmitted through said condenser lenses incident on split portions of corresponding line sensors.

6. The focus detecting apparatus of claim 5, wherein said pair of line sensors are provided for each of said respective re-imaging optical systems, so that images of said bundle of rays that are incident on said focus detecting zone in different directions and transmitted through said common separator lens are formed on said pair of respective line sensors.

7. The focus detecting apparatus of claim 1, wherein said focus detecting zone is located at a position that deviates from said optical axis of said taking lens.

8. The focus detecting apparatus of claim 1, wherein it is applied to a single lens reflex camera.

9. The focus detecting apparatus of claim 8, wherein said taking lens comprises an interchangeable lens.

10. The focus detecting apparatus of claim 8, wherein said taking lens comprises a zoom lens.

11. The focus detecting apparatus of claim 1, wherein said at least one pair of line sensors are selectively used in accordance with a position of said exit pupil of said taking lens.

12. The focus detecting apparatus of claim 3, wherein one of said at least two re-imaging optical systems comprises a prism that is located after said common condenser lens to refract an optical path of said associated bundle of rays.

13. The focus detecting apparatus of claim 1, wherein said at least one pair of line sensors are positioned on a same side of said optical axis.

14. A focus detecting apparatus, in which a pair of bundle of rays, transmitted through different portions of an exit pupil of a taking lens, are transmitted through a common focus detecting zone that is formed on an imaginary focal plane of said taking lens, comprising:

at least two re-imaging optical systems, each of which reform images of said pair of bundle of rays onto a common line sensor located at a predetermined position, said common line sensor being provided for said at least two re-imaging optical systems, wherein said common line sensor receives, through each of said at least two re-imaging optical systems, images of said pair of bundle of rays, that are incident on said focus detecting zone in different directions and which are transmitted therethrough, in accordance with a change in position of said exit pupil in an optical axis direction of said taking lens.

15. The focus detecting apparatus of claim 14, wherein said at least two re-imaging optical systems comprise a common condenser lens and separator lenses which make associated bundle of rays, transmitted through said common condenser lens, incident on split portions of said common line sensor.

16. The focus detecting apparatus of claim 5, wherein one of said at least two re-imaging optical systems comprises a prism that is located before said common condenser lens to refract an optical path of said associated bundle of rays.

17. The focus detecting apparatus of claim 16, wherein one of said at least two re-imaging optical systems comprises a light intercepting means intercepting an optical path of one of said at least two re-imaging optical systems.

18. The focus detecting apparatus of claim 17, wherein said light intercepting means intercepts said optical path of one of said at least two re-imaging optical systems that is not used.

19. The focus detecting apparatus of claim 15, wherein one of said at least two re-imaging optical systems comprises a prism that is located after said common condenser lens to refract an optical path of said associated pair of bundle of rays.

20. The focus detecting apparatus of claim 14, wherein said common line sensor comprises two sensor portions that are positioned on a same side of said optical axis.

21. A focus detecting apparatus, comprising:
at least two re-imaging optical systems provided for viewing an exit pupil of a taking lens through a common focus detecting zone from a plurality of directions; and
means for viewing said exit pupil through at least one of said at least two re-imaging optical systems, in accordance with a change in a position of said exit pupil in an optical axis direction.

22. The focus detecting apparatus of claim 21, wherein each of said at least two re-imaging optical systems comprise a condenser lens and separator lenses which make an associated bundle of rays, transmitted through said condenser lens, incident on split portions of a line sensor of said at least two re-imaging optical systems.

* * * * *

UNITED STATES PATENT AND TRADEMARK OFFICE
CERTIFICATE OF CORRECTION

PATENT NO. : 5,327,192
DATED : July 5, 1994
INVENTOR(S) : Takayuki SENSUI

It is certified that error appears in the above-indentified patent and that said Letters Patent is hereby corrected as shown below:

On the cover sheet, in section [56], "References Cited", line 41, change "No. 2-58012.4" to ---No. 2-58012.---.

At column 8, line 15 (claim 3, line 2) change "comprises" to ---comprise---.

At column 8, line 28 (claim 5, line 3) change "or" to ---of---.

At column 9, line 17 (claim 16, line 1) change "claim 5" to ---claim 15---.

At column 9, line 24 (claim 17, line 3) change "means intercepting" to ---means for intercepting---.

Signed and Sealed this

Twenty-ninth Day of August, 1995

Attest:

BRUCE LEHMAN

*Attesting Officer*   *Commissioner of Patents and Trademarks*